US009913305B2

(12) United States Patent
Pinheiro et al.

(10) Patent No.: US 9,913,305 B2
(45) Date of Patent: Mar. 6, 2018

(54) SYSTEMS, METHODS, AND DEVICES FOR CONGESTION CONTROL ON A MOBILE NETWORK

(71) Applicant: Intel IP Corporation, Santa Clara, CA (US)

(72) Inventors: Ana Lucia A. Pinheiro, Breinigsville, PA (US); Candy Yiu, Beaverton, OR (US); Marta Martinez Tarradell, Hillsboro, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 227 days.

(21) Appl. No.: 14/671,958

(22) Filed: Mar. 27, 2015

(65) Prior Publication Data

US 2016/0044529 A1  Feb. 11, 2016

Related U.S. Application Data

(60) Provisional application No. 62/035,707, filed on Aug. 11, 2014.

(51) Int. Cl.
*H04W 76/02* (2009.01)
*H04W 28/02* (2009.01)

(52) U.S. Cl.
CPC ..... *H04W 76/023* (2013.01); *H04W 28/0247* (2013.01); *H04W 76/027* (2013.01)

(58) Field of Classification Search
CPC ........... H04W 76/023; H04W 28/0247; H04W 76/027
See application file for complete search history.

(56) References Cited

U.S. PATENT DOCUMENTS

| 2006/0171350 | A1 | 8/2006 | Taniguchi et al. | |
| 2008/0240086 | A1* | 10/2008 | Bouckaert | H04Q 3/0025 370/352 |
| 2009/0285119 | A1 | 11/2009 | Horn et al. | |
| 2012/0123914 | A1* | 5/2012 | Sharma | H04M 15/00 705/30 |
| 2013/0088956 | A1 | 4/2013 | Zhou et al. | |
| 2013/0148497 | A1 | 6/2013 | Chan et al. | |
| 2014/0010090 | A1* | 1/2014 | Xiao | H04L 1/08 370/242 |
| 2014/0162643 | A1* | 6/2014 | Lee | H04W 4/008 455/435.1 |
| 2016/0044525 | A1* | 2/2016 | Alnashi | H04W 4/005 455/418 |

OTHER PUBLICATIONS

3GPP TS 23.303, "Technical Specification Group Services and System Aspects; Proximity-based services (ProSe) Stage 2 (Release 12)", V12.1.0, Jun. 2014, 60 pages.
PCT/US2015/036290, International Search Report and Written Opinion, dated Sep. 22, 2015, 13 pages.

\* cited by examiner

*Primary Examiner* — Benjamin H Elliott, IV
*Assistant Examiner* — Kevin Lee
(74) *Attorney, Agent, or Firm* — Stoel Rives LLP

(57) ABSTRACT

A user equipment (UE) is configured to send one or more service requests to a third party server via a mobile communications network, such as an evolved packet core (EPC). The UE is configured to determine that there is an error or delay in receiving a response to the one or more service requests from the third party server, and to send a wake-up request to a network element in the mobile communications network requesting notification when the third party server is available.

12 Claims, 9 Drawing Sheets

SYSTEMS, METHODS, AND DEVICES FOR CONGESTION CONTROL ON A MOBILE NETWORK

RELATED APPLICATION

This application claims the benefit under 35 U.S.C. § 119(e) of U.S. Provisional Application No. 62/035,707, filed Aug. 11, 2014, which is hereby incorporated by reference herein in its entirety.

TECHNICAL FIELD

The present disclosure relates to congestion control on a mobile network and more particularly relates to congestion control assisted by a wireless mobile device.

DETAILED DESCRIPTION OF PREFERRED EMBODIMENTS

Figure 1:
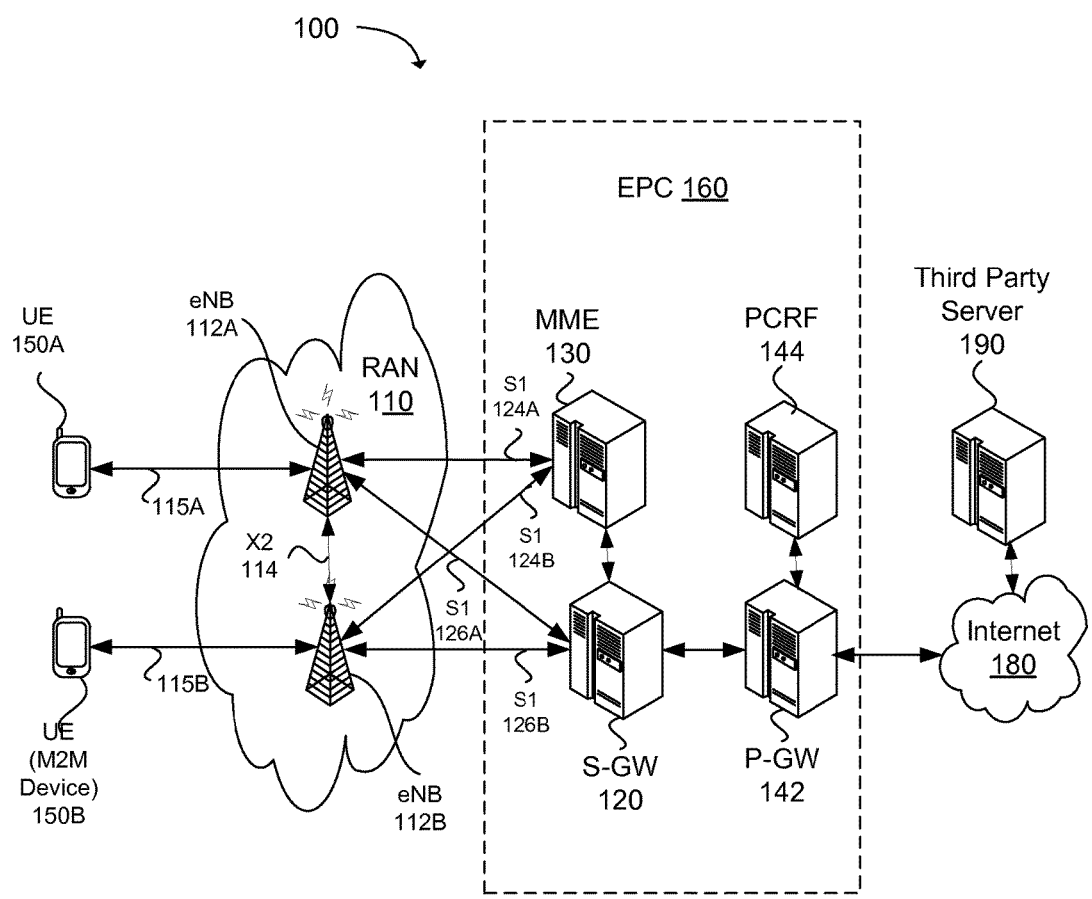
FIG. 1 is a schematic diagram illustrating a communication system for providing communication services to a wireless mobile device consistent with embodiments disclosed herein.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as WiFi. In 3GPP radio access networks (RANs) in LTE systems, the base station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs) in a UTRAN or E-UTRAN, which communicates with the wireless mobile device, known as user equipment (UE). A downlink (or DL) transmission can be a communication from the base station (or eNB) to the wireless mobile device (or UE), and an uplink (or UL) transmission can be a communication from the wireless mobile device to the base station.

Mobile and wireless networks can experience significant variations in traffic load. For example, the number of connected devices present on the network can change in response to events, time of day, or the like. Similarly, emergency situations may cause a spike in communications or damage to network infrastructure, reducing how much traffic a network can handle. In some situations, heavy loads may be managed using congestion controls (also referred to as access control functionalities or access controls) that may limit certain devices or types of traffic from using the network to increase the likelihood that important traffic will be communicated. Currently, a number of access control functionalities are used in 3GPP to selectively disable or bar devices or types of traffic from being used over the network. For example, Access Class Barring (ACB) allows the network to forbid UEs from having initial random access channel (RACH) access for specific access controls, such as circuit switched fallback (CSFB) controls to support legacy devices that use circuit switched services. As another example, Service Specific Access Control (SSAC) allows the network to forbid UEs from doing initial RACH access for Internet protocol (IP) multimedia services (IMS) voice or video.

With the rapid growth in the market and deployment of mobile devices, congestion control has become an important topic. For example, the 3GPP is currently undertaking a Feasibility Study on Application specific Congestion control for Data Communication (FS_ACDC), which aims to provide potential requirements and solutions to enable devices accessing the network for certain specific applications (e.g., Disaster Message Board) to have network access granted while the network is congested and other devices (accessing for other applications) are barred from accessing the network.

However, there are cases where the network is not congested but devices may be trying to access a server that might be congested or is encountering some difficulties. This may cause the devices to repeatedly attempt to communicate with the given server. If a large number of devices in the same cell are trying to communicate with the same (congested) server, the RAN may become congested due to repeated requests from multiple co-located devices. If the 3GPP network was notified of the server difficulties, it may be able to control the devices and bar the devices that are trying to access the congested server from accessing the network until the server difficulties are resolved.

In a newly approved 3GPP SA1 study item (S1-141182) named Feasibility Study on Control of Applications when Third party Servers encounter difficulties (FS_CATS), the following objective has been identified: "The objective of this study is to identify potential requirements that will enable the 3GPP network to detect or receive an indication from a third party server of its congestion status or failure status and selectively control individual applications on UEs when the 3GPP network becomes aware that a third party server has run into difficulties." The justification for the study item is given as follows: "The 3GPP network needs to be able to detect or receive an indication from a third party server of its congestion status or failure status and selectively control applications that make use of a third party server that has encountered difficulties. An HTTP [hypertext transfer protocol] 404 error is not sufficient as it does not provide an indication to the application at the UE of the nature of the issue and therefore could result in frequent retries even when these will fail, thus burdening the network with connection attempts that will fail. Third Party server failure modes can be envisaged where the server is not able to provide any HTTP status code." (S1-141182.)

In the present disclosure, methods for detection of a congestion or a failure status of a third party server are presented. In some embodiments, detection of congestion or implementation of congestion control is performed with UE assistance.

In order to improve clarity and to avoid obscuring the disclosure, the embodiments and examples provided herein focus on systems, methods, and apparatuses that operate based on a 3GPP LTE standard. Although terminology and examples of operation are generally directed toward LTE, one of skill in the art will recognize modifications to apply various teachings to other communication standards. Terminology such as UE, eNB, or other terms used in the specification should be understood as encompassing other similar systems or components used in other communication protocols.

A detailed description of systems, devices, and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

FIG. 1 illustrates one embodiment of a communication system 100 for providing communication services to UEs 150A and 150B. The communication system 100 includes a RAN 110, which includes eNBs 112A and 112B, and an evolved packet core (EPC) 160. The system operates based on the 3GPP LTE specification, such as on any currently available or future releases. The RAN 110 may include a macro node and a plurality of low power nodes.

The UEs 150A and 150B may include any type of communications and/or computing device. Example UEs include phones, smartphones, personal digital assistants (PDAs), tablet computers, notebook computers, ultrabook computers, machine-to-machine (M2M) devices, or the like. The UEs 150A and 150B may include a plurality of applications installed and running on the UEs 150A and 150B, which may periodically communicate data over the RAN 110 and/or EPC 160. The UEs 150A and 150B may include devices configured to communicate using a 3GPP standard such as universal mobile telecommunication system (UMTS), LTE, LTE-Advanced (LTE-A), or the like. In some embodiments, the UEs 150A and 150B may include devices configured to communicate based on any other wireless communication standard.

The RAN 110 is configured to provide wireless data access to the UEs 150A and 150B and a plurality of other wireless mobile devices. The RAN 110 provides wireless data, voice, and/or other communications available through the EPC 160 to the UEs 150A and 150B including the plurality of applications installed on the UEs 150A and 150B. In one embodiment, the RAN 110 operates according to a wireless protocol, such as a wireless protocol that the UEs 150A and 150B are capable of using. The eNBs 112A and 112B may implement transmission point and RNC functions. The eNBs 112A and 112B are configured to communicate with each other via an X2 interface 114, as depicted. The X2 link is typically formed over a broadband wired or optical connection between the eNBs 112A and 112B.

The eNBs 112A, 112B may be connected to one or more UEs, such as UEs 150A, 150B, via LTE radio links 115A, 115B, respectively. Connections between the eNBs 112A, 112B, a serving gateway (S-GW) 120, and a mobility management entity (MME) 130 may be made via S1 type connections 124A, 124B, and 126A, 126B. The S1 interface is described in 3GPP Technical Specification (TS) 36.410 versions 8 (2008 Dec. 11), 9 (2009 Dec. 10), and 10 (2011 Mar. 23), which are available to the public.

The EPC 160 may include S-GW 120 and MME 130. The EPC 160 may also include a packet data network (PDN) gateway (P-GW) 142 to couple the S-GW 120 to a PDN, such as the Internet 180, an intranet, or other similar network. Thus, the EPC 160 may be able to access a plurality of third party servers, such as third party server 190, via the Internet 180 or other network. The S-GW 120 and MME 130 may be in direct communication with each other via cabling, wire, optical fiber, and/or transmission hardware, such as a router or repeater. The EPC 160 may also include a policy and charging rules function (PCRF) node 144 that may be used to determine, in near real time, policy rules in the wireless network. The PCRF node 144 may access subscriber databases and other specialized functions, such as charging systems, as may be appreciated.

It is advantageous for the communication system 100 (such as a 3GPP network) to be able to identify congestion status of a third party server, such as third party server 190, so that the network 100 can limit access retries to a server that is encountering problems. This optimizes bandwidth utilization in the network 100, as UEs 150A and 150B will not continuously retry to access the third party server 190. The third party server 190 may include any server not corresponding to the network 100, such as a server that provides a web page, web services, or any other service via a network connection. A discussion of methods, functions, or operations to be performed by the network 100 are disclosed below. Please note that any of the methods, functions, or operations disclosed in relation to the network 100 may be performed by an entity, server, or other element of the network 100. For example, the MME 130, S-GW 120, P-GW 142, or other element in the EPC 160 may communicate with a third party server 190, receive notifications from the RAN 110 or UEs 150A, 150B, or make determinations regarding congestion. In one embodiment, a combination of different entities may perform different steps of a method to identify a congestion status and/or implement congestion control. In one embodiment, a new element, including new hardware and or new functionality running on an existing server, may be introduced into the EPC 160 to perform at least a portion of the functionality disclosed herein.

Various options for determining whether a third party server 190 is congested may be considered. In one option, the network 100 may detect the congestion or failure of the third party server 190 is by receiving a notification from the third party server 190. For example, when the server 190 encounters problems, it may send a notification via the control plane to notify the network 100 of the problem. This method works as a "push" where the third party server 190 pushes the information to the network 100. Another option is that the network 100 monitors the activity towards the third party server 190 and, based on failure requests between the UE 150A, 150B and the server 190, the network 100 determines that the third party server 190 has a problem. Yet another option is for the network 100 to request (i.e., pull) the information from the third party server 190. This request can be done periodically: for example, the network 100 may periodically send a request to the third party server 190 to obtain failure information. The third party server 190 may then reply to the request indicating whether or not there is congestion or a failure.

Figure 2:
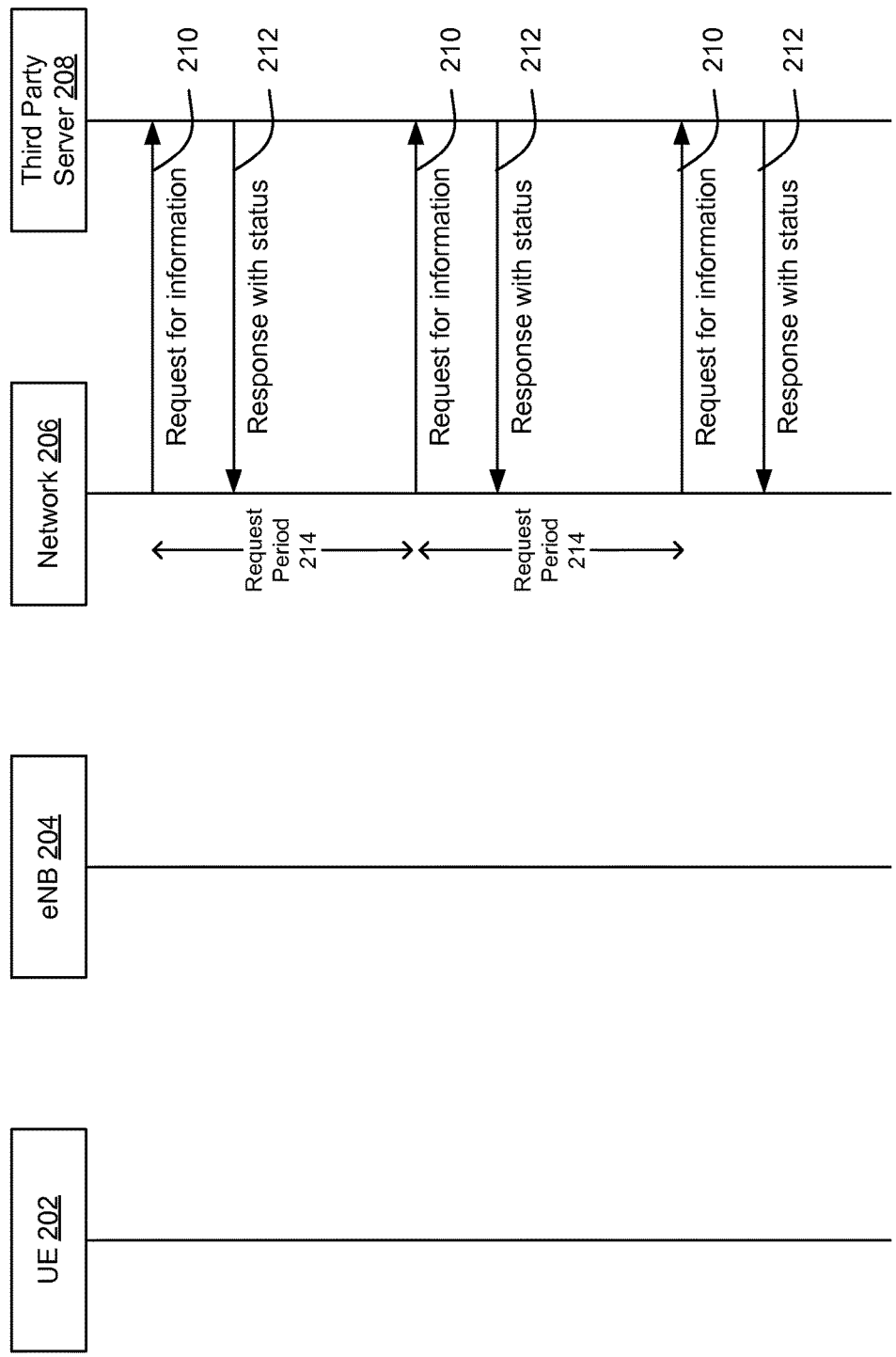
FIG. 2 is a schematic block diagram illustrating a pull method for determining a status of a third party server consistent with embodiments disclosed herein.

FIG. 2 is a schematic call diagram illustrating an example pull method where a network 206 (such as the network 100 of FIG. 1) periodically "pulls" information regarding status of a third party server 208. At 210, the network 206 requests information from the third party server 208. At 212, the network 206 receives a response with a status of the third party server 208. A request period 214 separates the requests 210 for information.

Figure 3:
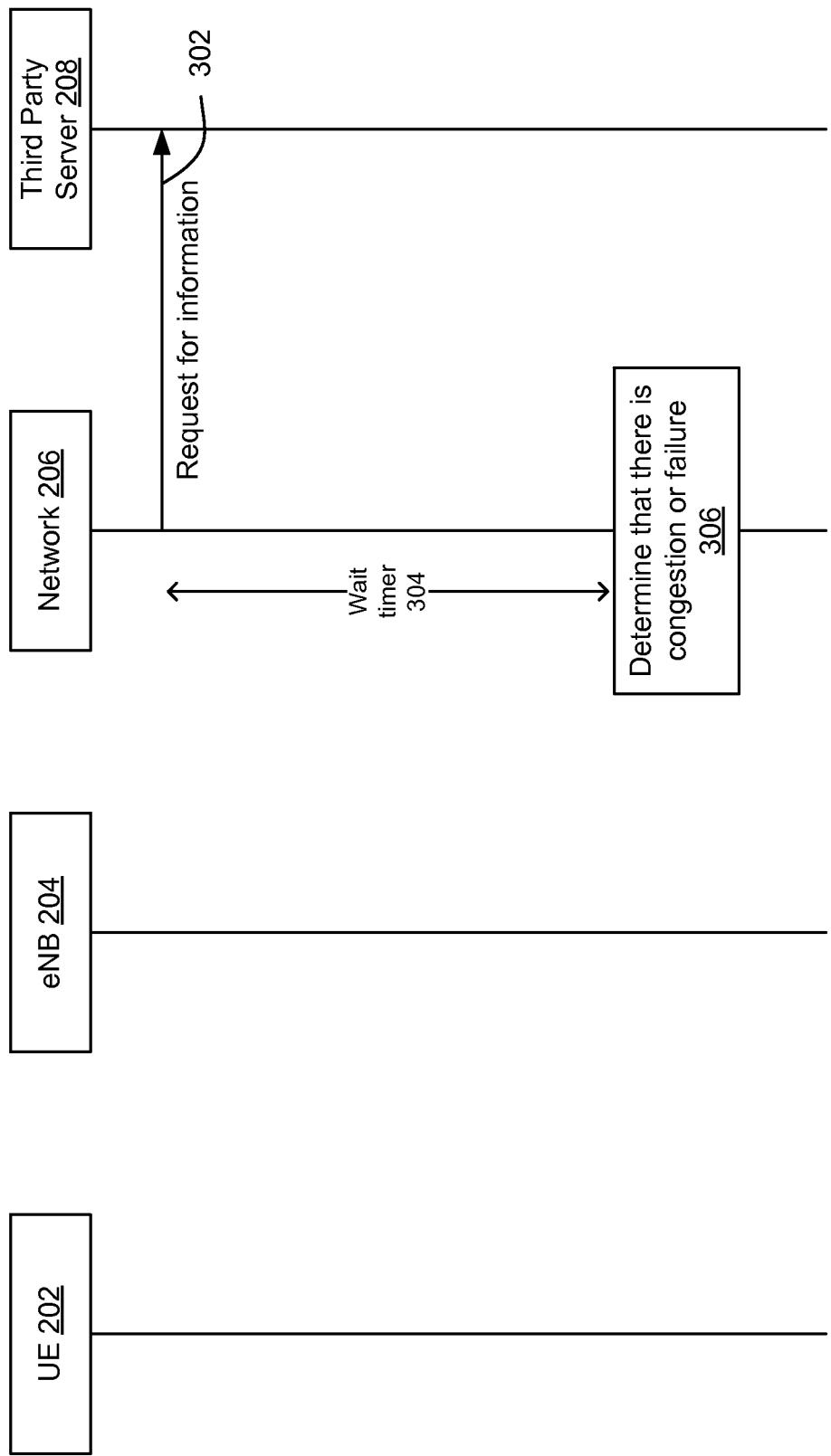
FIG. 3 is a schematic block diagram illustrating another pull method for determining a status of a third party server consistent with embodiments disclosed herein.

Optionally, a lack of response after a request (e.g., request at 210) from the network 206 to the third party server 208 may be interpreted as failure or congestion. In FIG. 3 a schematic call diagram illustrating an example pull method is shown. At 302, a request for information is sent by the network 206 (such as by an MME 130 and/or P-GW 142 element). If a reply is not received after expiration of a wait timer 304, the network 206 may determine, at 306, that there is congestion or failure at the third party server 208. For example, an MME 130, P-GW 142, or other network element may start the wait timer 304 at 302, when the request is sent. In one embodiment, the server 208 may determine that congestion or failure has occurred after a predefined period of time (e.g., the wait timer 304) and/or a predetermined number of trials.

In some embodiments, the process of periodically pulling information from a third party server 208 may not be optimal. For example, if the request period 214 is too long, then events might be missed by the network 206. If the request period 214 is too short, the overhead may be very high. Finding an optimal or perfect periodicity may be very difficult. In order to more efficiently determine a status of a third party server 208, in at least one embodiment, the network 206 can use other information obtained from one or more UEs 202.

In one embodiment, the network 206 may determine that a third party server 208 is likely to be experiencing problems (congestion or failure) based on information received directly from UEs 202 or based on information obtained indirectly from the UEs 202. In one embodiment, for example, the network 206 may trigger pulling information from a third party server 208 (sending a request for information 210) only if a number of users accessing the third party server 208 is greater than a threshold. The threshold may apply to a number of UEs 202 using the third party server 208 on a single cell or may correspond to a number of UEs 202 using the third party server 208 via an EPC 160.

Various embodiments may use information received directly from one or more UEs 202. For example, a UE 202 may obtain information regarding a failure or congestion situation of the third party server 208. A first approach is that the UE 202 sends a notification that access to the third party server 208 has failed. For example, the network 206 may pull status information from the third party server 208 in response to receiving the notification from the network 206 that access to the server 208 failed. A second approach, similar to the first approach, is that the network 206 does not pull information from the third party server 208, but instead infers that there is congestion or a failure based on information provided by the UEs 202. In a third approach, a UE 202 notifies the network 206 of a failure and requests the network 206 to notify the UE 202 when the third party server 208 becomes available. For example, the network 206 may begin pulling the status of a third party server 208 in response to receiving the notification from the UE 202 and notify the UE 202 when the third party server 208 again becomes available. In a fourth approach, the network 206 uses UE 202 related information as well as other configuration information to allow or reject an attempt by a UE 202 to connect with a third party server 208.

The above approaches may require that a UE 202 is configured or allowed to report the failure of accessing a third party server 208. The UE 202 may be configured by a 3GPP network (network 206 or EPC 160). Optionally the third party server 208 may configure the UE 202 to report the failure. Optionally the configuration to report the failure may be static, such as part of the UE 202 subscription in the home subscription service (HSS) and provisioned in the UE. Further description of the above approaches is provided below.

In the first approach, a UE 202 notifies the network 206 of a possible problem with a third party server 208. The notification can be to the eNB 204, EPC 160, or other entity (e.g., the MME 130). The network 206 determines, based on the notification, whether the third party server 208 is congested or there is a problem with the third party server 208. If there is a problem, the network 206 may trigger CATS. For example, the network 206 may notify an eNB 204 or UE 204 that the third party server 208 is not available.

Figure 4:
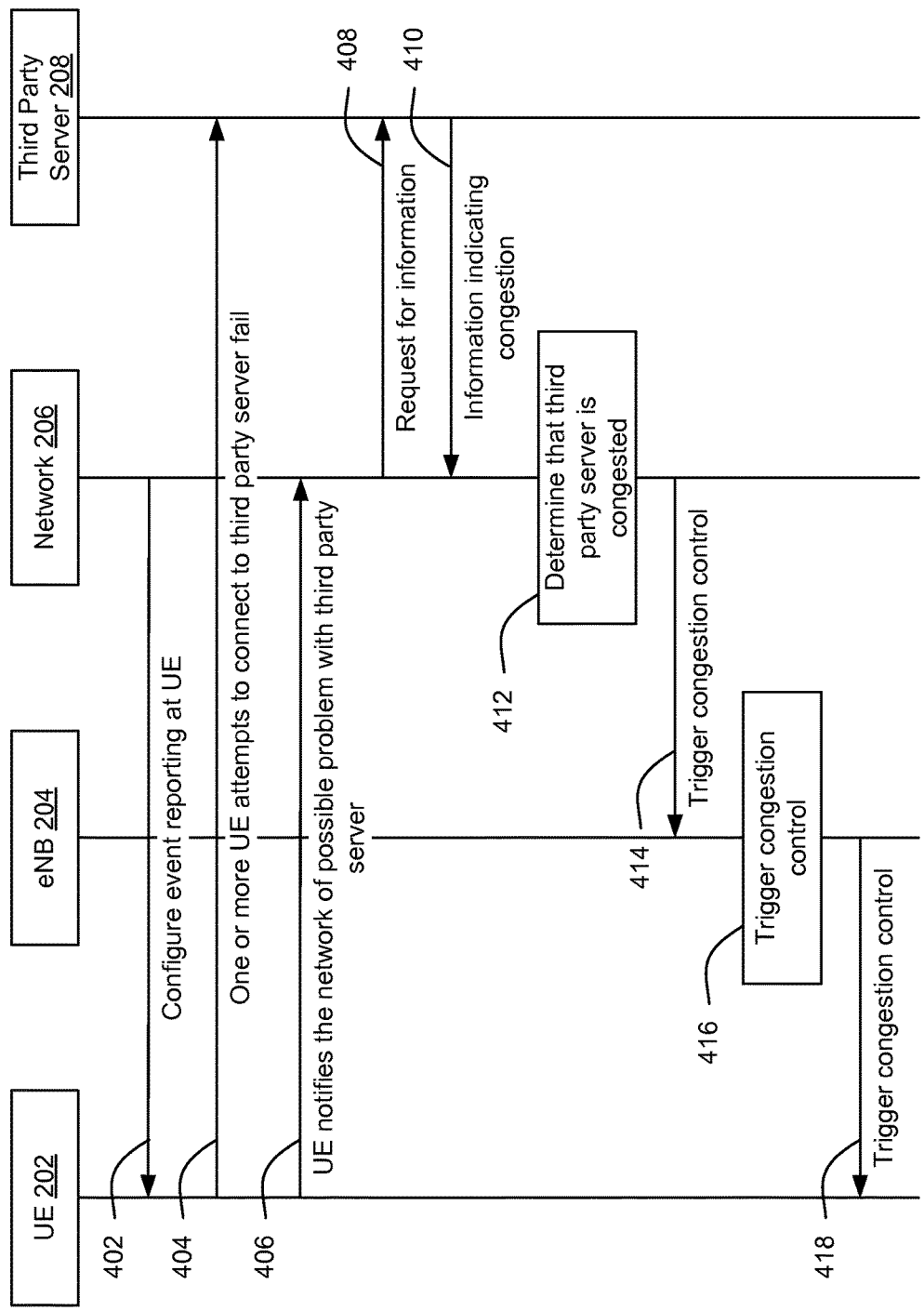
FIG. 4 is a schematic block diagram illustrating a method for determining a status of a third party server consistent with embodiments disclosed herein.

FIG. 4 illustrates one embodiment of a call flow determining a third party server status based on a notification from a UE 202. At 402, the network 206 configures the UE 202 to report failure or congestion events in relation to a third party server 208. At 404, the UE 202 attempts but fails to connect to the third party server 208. The UE 202 may attempt to connect until a threshold is reached or wait for a predetermined amount of time for a response to be received from the third party server 208. If the UE 202 is unable to connect with the third party server 208, the UE 202 notifies, at 406, the network 206 of a possible problem with the third party server 208. For example, the UE 202 may receive an error message from the third party server 208 or may not receive a response after a predetermined wait time and/or number of attempts. At 408, the network 206 requests status information from the third party server 208. For example, the network 206 may check whether the third party server 208 is congested or has failed. At 410, the network 206 receives information indicating congestion from the third party server 208. At 412, the network 206 determines that the third party server 208 is congested or has experienced a failure. At 414 the network 206 sends a message to an eNB 204 triggering congestion control for that server (e.g., CATS). The eNB 204 triggers congestion control at 416 and sends a message at 418 triggering congestion control with the UE 202. For example, the message at 418 may indicate that the UE 202 should not contact the third party server 208 for a time period, until a later message from the network 206, and/or the like.

According to another embodiment, the network 206 may inspect a packet sent by the UE (e.g., at 404 in FIG. 4). If the number of requests sent by the same UE 202 and/or to the same third party server 208 with no response exceeds some thresholds, the network 206 may pull status information from the third party server 208 and stop the UE 202 from generating more traffic (e.g., by trigger congestion control at 414). Similarly, the network may inspect a packet returned by the third party server 208, such as an HTTP 404 error message, to determine that the third party server is experiencing problems.

In the second approach, the first approach above may be modified to omit the request for information at 408 and to omit the receiving of information indicating congestion at 410. For example, the network 206 may determine, at 412, that the third party server 208 is congested based on the message at 406 without needing to pull a status directly from the third party server 208. For example, the network 206 may simply conclude that the third party server 208 is congested based on the notification at 406 from the UE 202 or based on a determination that the UE 202 has received an error message or has not received any response from the third party server 208.

In the third approach, the UE 202 requests notification when the third party server 208 is available, or notification of the status of the third party server 208. In one embodiment, for example, after the UE 202 sends multiple requests to the third party server 208 with no response, the UE 202 can send a wake-me-up notification request to the network 206. When the network 206 receives this request, it periodically pulls data (e.g., a non-standardized ping message or standardized message) from the third party server 208. Once the server 208 responds indicating a non-congested or non-failure status, the network 206 notifies the UE 202 that the third party server 208 is restored. The UE 202 may then send a request for service from the third party server 208.

Figure 5:
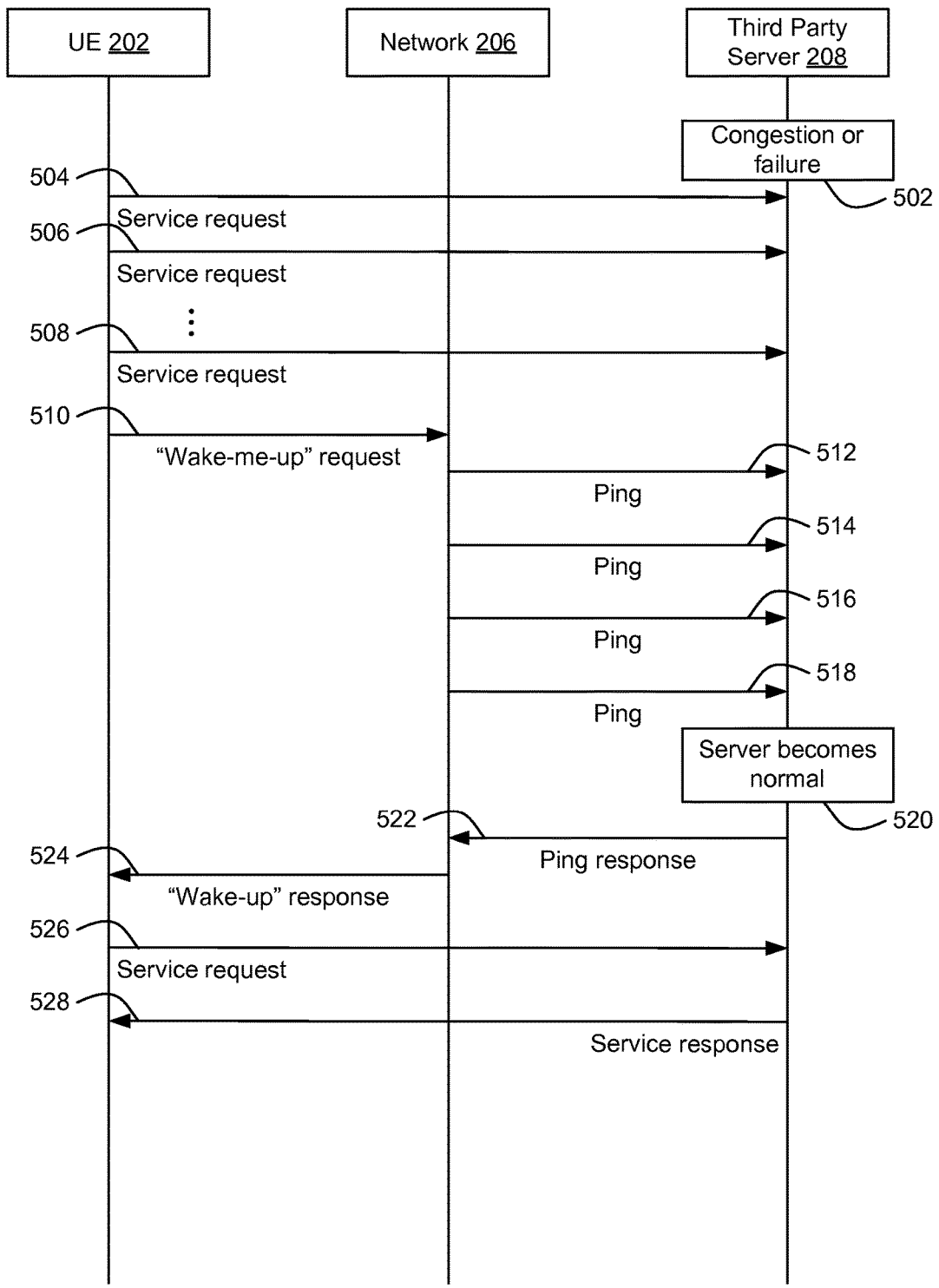
FIG. 5 is a schematic block diagram illustrating a method for reducing service requests from a communication device using wake-up messages consistent with embodiments disclosed herein.

FIG. 5 illustrates a call flow for a wake-up notification from the network 206. At 502, the third party server 208 is experiencing congestion or failure such that it is not able to service at least some service requests. At 504, 506, and 508, the UE 202 sends service requests. The UE 202 may continue sending service requests to the server until a threshold number of service requests without response is reached. Once the threshold is reached, the UE 510 sends a wake-me-up request at 510 to the network 206. The UE 202 can then stop sending service requests to the server in order to reduce power or other resource consumption by the UE 202 as well as load on the network 206. The wake-me-up request at 510 may include a name, address, or the like, of the third party server 208 so that the network 206 can check with the third party server 208 and notify the UE 202 when it becomes available. In response to receiving the wake-me-up request, the network 206 pings the third party server 208 at 512, 514, 516, and 518. The network 206 may ping the third party server 208 at a requested interval until the third party server 208 is once again available. Or some other method can be used to determine when to ping the third party server, such as monitoring other UEs requests to that same server. The third party server 208 begins operating normally again at 520 and sends a ping response at 522. In response to receiving the ping response, at 524 the network 206 sends a wake-up response notification to the UE 202. The UE 202 then sends a service request 526 to the third party server 208 and the third party server provides a service response at 528. The call flow of FIG. 5 is illustrative of how the network 206 can determine a status of the third party server 208 so that one or more UEs 202 do not continually send service requests to a downed server. In some situations, signaling on the network 206 may be substantially reduced.

In one embodiment, the network 206 may provide a service registration service for device-to-device (D2D) communication, M2M, Internet of things (IoT), and other small device communication services. These devices often only communicate to one or a few servers. These small devices (such as UE 202) can send a service registration request to the network 206. The network 206 may then periodically ping the specific third party server 208 to check if it is operational, congested, or working normally. When the registered devices send service requests, the network 206 may check the status of the third party server 208 before forwarding the request. If the third party server 208 is working normally, the network 206 may then forward the request to the third party server 208. On the other hand, if the third party server 208 is congested or down, it activates congestion control (e.g., CATS). If the third party server 208 is down, a notification to the UE 202 may include different types of information regarding when/whether the UE 202 can try again to access the third party server 208. In one embodiment, the notification that the third party server 208 is down or congested may indicate that the UE 202 must wait to retry for at least a specified amount of time (e.g., five seconds). In one embodiment, the notification that the third party server 208 is down or congested may indicate that the UE 202 is not allowed to send another request to the third party server 208 until the network 206 notifies the UE 202 that it is allowed to send a request. In one embodiment, the notification that the third party server 208 is down or congested may indicate another third party server (or other server) that provides the desired service (e.g., provides the same service as a down third party server 208).

Figure 6:
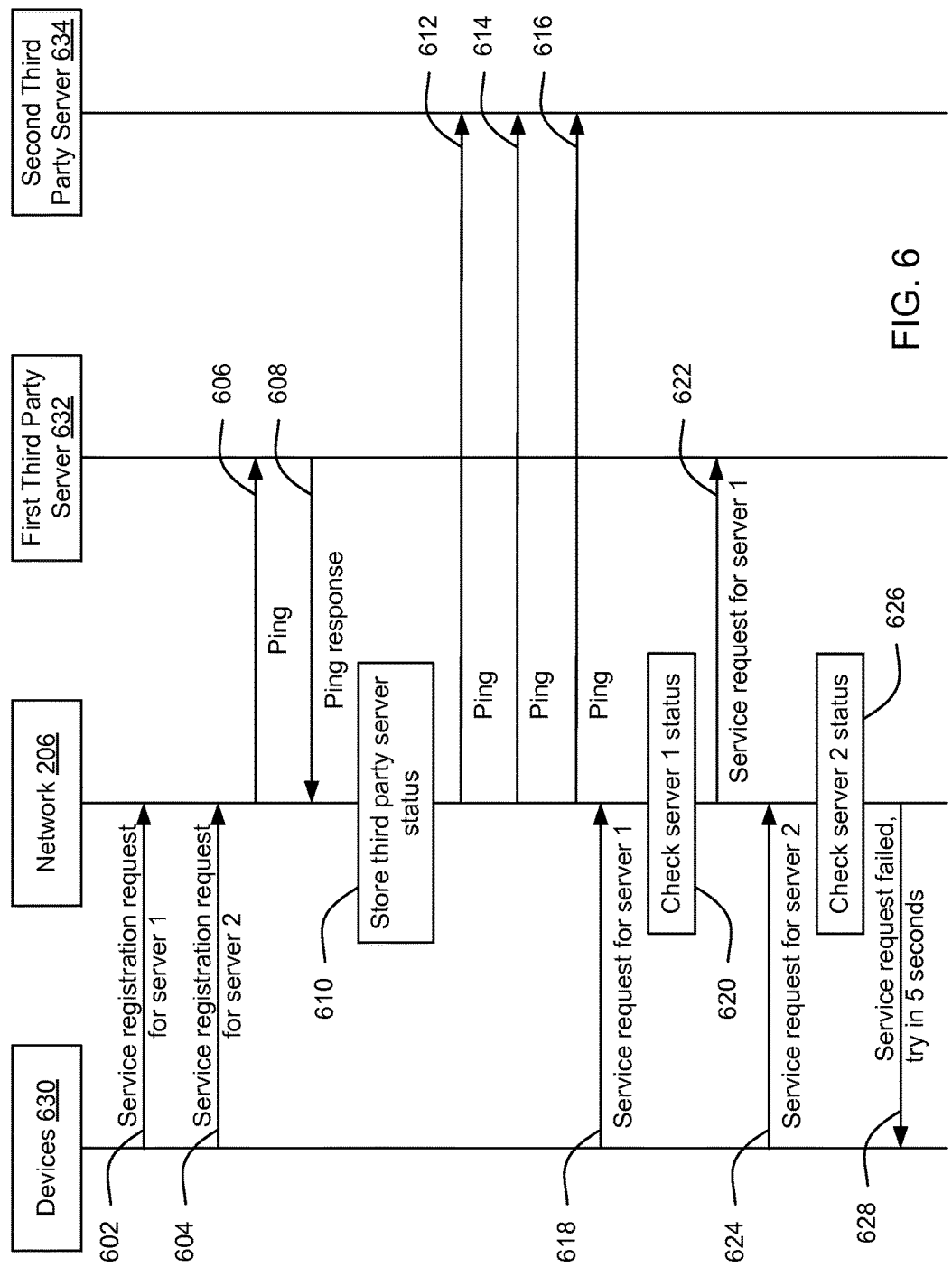
FIG. 6 is a schematic block diagram illustrating a method for service registration consistent with embodiments disclosed herein.

FIG. 6 illustrates a call flow for a service registration service. At 602, one or more devices 630 send one or more service registration requests for a first third party server 632 (server 1). At 604, one or more devices 630 send one or more service registration requests for a second third party server 634 (server 2). In response to getting the service registration requests, the network 206 may send a service request acknowledgement (ACK). The network 206 may then begin tracking the status of the third party servers 632, 634. At 606, the network 206 pings the first third party server 632, and it receives a ping response at 608. The received ping response at 608 may indicate to the network 206 that the first third party server 632 is active. At 610, the network 206 stores a status indicating that the first third party server 632 is available. At 612, 614, and 616, the network 206 pings the second third party server 634 and does not receive a response. The network 206 may store an indication that the second third party server 634 is not available until it receives a ping response.

At 618, one or more devices 630 send a service request for the first third party server 632 (server 1), which is received by the network 206. In response to receiving the service request, the network 206 checks the status of the first third party server 632 at 620. At 622, the network 206 forwards the service request to the first third party server 632. For example, the network 206 forwards the request because the network 206 receives a ping response from the first third party server at 608. The first third party server 632 may then provide the requested service to one or more requesting devices 630.

At 624, one or more devices 630 (UEs, machine-to-machine devices, or the like) send a service request for the second third party server 634 (server 2). The network 206 checks the status of the second third party server 634 at 626. Because no ping response was received from the second third party server 634, the status stored by the network 206 may indicate that the second third party server 634 is unavailable (congested or experiencing failure). At 628, the network 206 sends a notification that the service request failed and that a retry may occur in five seconds. The notification that the service request failed may additionally or alternatively indicate that the devices 630 should not send additional requests to the second third party server 634 until further information is received from the network 206, and/or may indicate a different server that provides the same service as was requested from second third party server 634. Optionally the network may, after step 616, broadcast to all UEs that are registered that the second third party server is not available, eliminating the initial signaling 624 from the UE towards that server.

In one embodiment, when the UE 202 sends a wake-me-up request to the network 206 (see FIG. 5 at 510) for a given specific application, then the UE 202 will automatically activate CATS (congestion control) for all applications from that same third party server 208. This may help to avoid extra UE 202 signaling and avoid a need for the network 206 to send indications to the UE 202 about congestion and CATS activation/deactivation for every application. When the UE 202 receives the wake-up response notification from the network 206 (e.g., at 524 in FIG. 5) the UE 202 will again attempt to access the third party server 208. Using the wake-me-up request and wake-up response may help to reduce overhead and UE 202 power consumption. This may especially be helpful for UEs 202 that have limited power and mostly access a single server for all applications of interest, as is the case for some machine-to-machine (M2M) devices. In one embodiment, when the UE 202 sends a wake-me-up request to the network 206 and an application that is attempting to access the server 208 is in a CATS black list (i.e., a list of applications not allowed when CATS is configured and active), then the network 206 will automatically activate CATS for that application in all other applicable UEs.

In the fourth approach, the network 206 determines whether to allow a UE 202 to connect with a third party server 208 before a service request is sent. In one embodiment, this approach assumes that the network 206 already has some status information about a specific third party server 208. This information may include a failure indication received from a UE 202 or the third party server 208, or as otherwise determined by the network 206. In one embodiment, the information may include the failure indication as well as corresponding actions to be applied to different group of UEs 202. For example, the failure indication may indicate a failure level for the third party server 208. For a specific failure level, the actions defined for one group of UEs 202 may be different from the actions defined for a second or third group of UEs 202. For example, the first group of UEs 202 may be re-routed to a different third party server, and the second group may be requested to wait unless they need to connect to the third party server 208 for priority reporting. Thus, a third party server 208 may be able to define different failure levels and their corresponding actions to be executed by the network 206 depending on the third party status at each instance of time.

In one embodiment, a UE 202 sends to the network 206 certain UE specific information. This UE specific information may be included as a new information element on an existing uplink message or in a newly created message. The new information element may indicate that the UE 202 would like to make a request to the specific third party server 208 (as shown at 704 in FIG. 7). This UE specific information may be sent to the network via radio resource control (RRC) and/or non-access stratum (NAS) messages. In addition, this UE specific information may be sent by UEs 202 that are already in connected mode with other ongoing connections, or by UEs 202 that are coming out of idle mode and requesting the establishment of an RRC connection.

In one embodiment, the UE specific information may include a length of time that the UE 202 expects to be connected to the third party server 208. This could be a number or a range. This estimate allows the network 206 to know how long the UE 202 will be generating traffic with this third party server 208. In one embodiment, the UE 202 estimates this value based on statistics of previous connections. In addition, the UE 202 may get this information directly from an upper layer, i.e., a requesting application. In one embodiment, the UE specific information may include an expected throughput needed to maintain the connection. The UE 202 may estimate this value based on statistics of previous connections for the specific service that the UE 202 is going to be using (e.g., to stream movies with high quality or for a video call). The UE specific information may include a minimum throughput and maximum throughput. The UE specific information may include an expected duration of connection. For example, the UE 202 may request to connect for more than one hour for movie watching or may only expect to connect for a duration as short as one millisecond (ms). The UE specific information may indicate a type of communication, such as a D2D, M2M, or short/small data message communication. This may allow the network 206 to determine that the message is short, such as for a meter report or traffic report. The UE specific information may indicate that the message will include emergency information to be sent for usage in the third party server 208, e.g. for alarms or health related alerts. The UE specific information may indicate a UE type or membership subscription level. The third party server 208 and/or network 206 may allow only certain subscription level users to connect during congestion. This UE specific information may be communicated between the UE 202, third party server 208, and/or the network 206.

Values for UE specific data or other settings may be defined as numbers, predefined ranges, or predefined values that are defined within a standard and are understood by both the UE 202 and the network 206. In one embodiment, the UE specific information is used by the network 206 (e.g., eNB 204 or MME 130) in addition to information about a status of the third party server 208 to determine whether a specific UE 202 or other device is allowed to send the request to the third party server 208. After determining whether UE 202 can continue, the network 206 notifies the UE 202 of the decision. In the case that the UE 202 is allowed to continue, the network 206 sends an accept or allow message to the UE 202. The network 206 may also send the request to the third party server 208 to allow the third party server 208 to respond. In one embodiment, the network 206 does not forward the request on but allows a subsequent service request from the UE 202 to pass to the third party server 208. For example, the UE 202 may send a service request in response to receiving an indication that it is allowed to connect to the third party server 208.

In the case that the UE 202 is not allowed to continue, the network 206 may send a negative response message that indicates to the UE 202 that the third party server 208 is not available. In one embodiment, the message also contains additional information such as a time period that the UE 202 must wait before trying again to access the server 208, information that the UE 202 could use to connect to a different third party server, or an indication that the UE 202 needs to wait for network notification before trying again.

Figure 7:
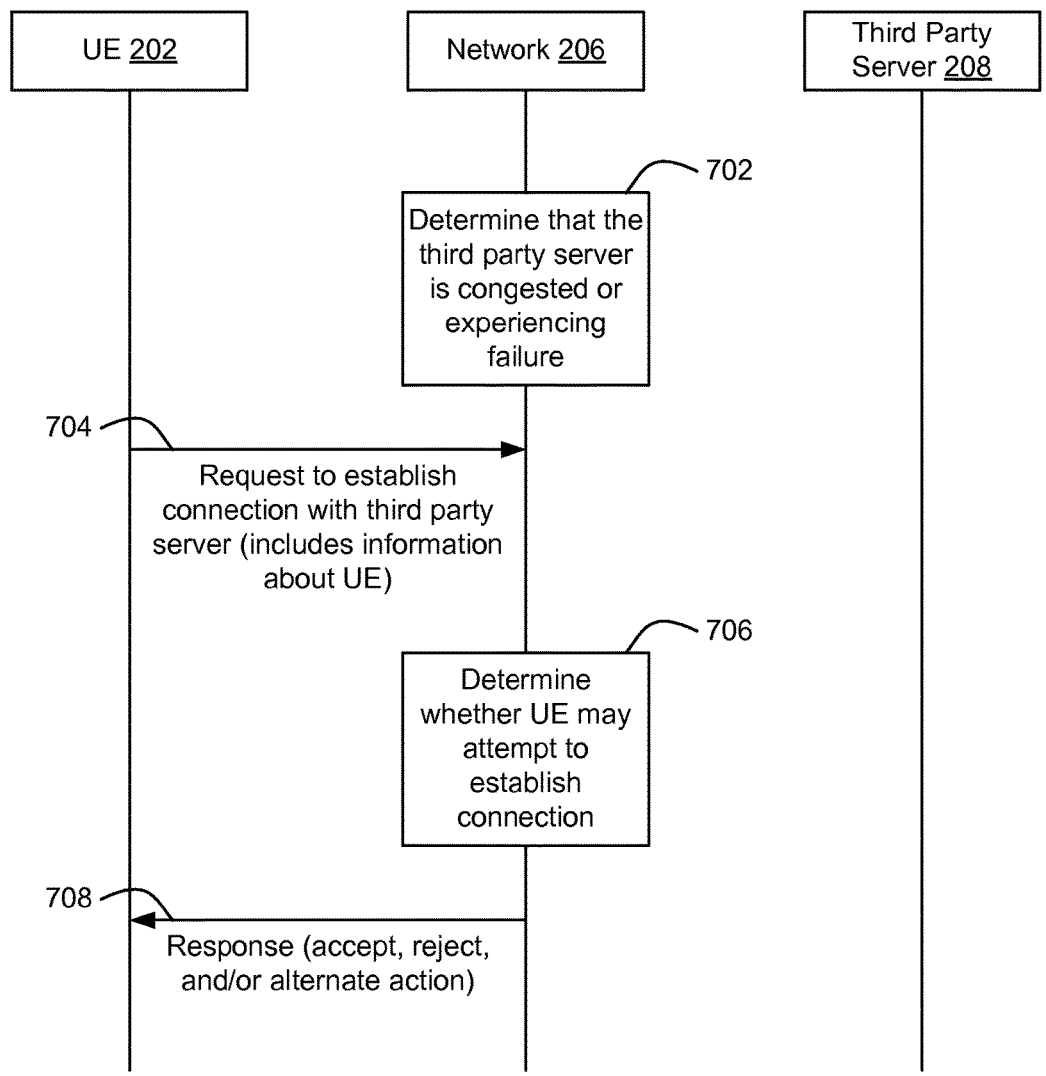
FIG. 7 is a schematic block diagram illustrating a method for negotiating access to a third party server consistent with embodiments disclosed herein.

FIG. 7 illustrates a call flow for negotiating access to a third party server 208. At 702, the network 206 determines that the third party server 208 is congested or experiencing failure. The network 206 may determine that there is congestion or failure based on any method disclosed herein or in any other manner. At 704, the UE 202 sends a request to establish connection with the third party server 208. The request may include a conventional service request or may include a request with additional UE specific information, such as any of the UE specific information discussed herein. At 706, the network 206 determines whether the UE 202 may attempt to establish a connection. The network 206 may determine whether to allow access based on the UE specific information, a current status of the third party server 208, and/or any other configuration or congestion level information received from the third party server 208. The network 206 sends a response to the UE 202 at 708. The response may indicate that the UE 202 is allowed access, and the UE 202 may then send a service request to the third party server 208. The response may indicate that the UE 202 is not allowed access (i.e., its request is rejected), and the UE 202 may then wait a specific time period before attempting to connect to the third party server 208 again or may wait until the network 206 allows another attempt. In one embodiment, the response may indicate an alternate action, such as information to allow the UE 202 to contact a different server that may provide the same service as the third party server 208. The UE 202 may then perform the indicated alternate action.

In one embodiment, a negotiation method may include additional by the UE 202 to respond to the network 206 based on the response sent at 708. For example, the UE 202 may respond and propose modifications to a connection with the third party server 208. As an example, a process for negotiating the connection may include the following: (1) the UE 202 requests connection establishment and includes information regarding a throughput/data rate that the UE 202 estimates it will need while connected to the third party server 208; (2) the network 206 conveys to the UE 202 that the third party server 208 cannot support a connection with that throughput at that time and, instead of rejecting the request, the network 206 offers the UE 202 to either wait for a period of time, or go ahead with the connection at a lower data rate; (3) if the UE 202 accepts the lower data rate, the UE 202 replies with a message with a request for the lower data rate; and/or (4) if the UE 202 prefers to wait, the UE 202 may not reply but rather wait the required period of time and then send a message with a request for the original data rate.

In one embodiment, congestion control services (such as CATS) are also applied to UEs 202 that are allowed to communicate directly with a third party server 208 (e.g., via another radio access network, such as WiFi) or via other UEs 202 (i.e., via device to device (D2D) communication). For example, the network 206 may allow UEs 202 to communicate the status of a server using a D2D interface rather than requiring the network 206 or an eNB 204 to notify each UE 202. In one embodiment, when CATS is activated in one UE 202 (e.g., directly via a dedicated message from the network 206, via a wake-up procedure, or using any other method), the UE 202 may notify nearby UEs 202 via D2D communication that the third party server 208 is overloaded. These nearby UEs 202 may then activate CATS and not access the third party server 208 until they are notified that the third party server 208 is restored.

In another embodiment, when one UE 202 is configured as a center UE, the center UE may notify nearby UEs via D2D communication that they should first inquire with the center UE if the server is restored before sending a service request. The center UE may also send a signal indicating that it is the center UE even before a third party server 208 goes down. For example, the center UE may indicate that the nearby UEs should check the status of the third party server 208 each time a connection to the third party server 208 needs to be established. In one embodiment, a UE 202 is configured as a center UE based on a message from the network 206, such as a dedicated message or a wake-up message as discussed herein. The nearby UEs may then only attempt to access the server 208 if the center UE informs them that the server 208 is restored or available.

In one embodiment, one UE 202 can be configured as a center UE and each UE may store a list of applications that may be blocked when CATS, or another congestion service, is activated. Thus, whenever the nearby UEs want to access a third party server 208 using an application in the list, the nearby UEs should first inquire with the center UE if the third party server 208 is in an available status (e.g., OK, not congested, etc.). For example, the nearby UEs may only try to access the third party server 208 if the center UE informs them that the third party server 208 is OK. When a server is congested or down, the network 206 may only need to inform the center UE.

A plurality of embodiments are possible based on the present disclosure. The example embodiments are listed herein by way of explanation and not by way of limitation. In one embodiment, the network 206 will pull status information from the third party server 208 only if a number of users (or UEs) accessing the server 208 is greater than a threshold. In one embodiment, the network 206 will pull status information from the third party server 208 when the UE 202 notifies the network 206 that access to the server 208 failed. In one embodiment, the network 206 will use the information provided by the UEs 202 to assess the third party server 208 status. In one embodiment, a UE 202 determines that there is a failure or congestion on the third party server 208 after a service request fails, and the UE 202 sends a wake-me-up message/request to the network 206. The network 206 notifies the UE 202 when the server 208 becomes available, via a wake-up response message. In one embodiment, when the UE 202 sends a wake-me-up request to the network 206 for a specific application, the UE 202 will automatically activate CATS (e.g., block access to the server 208) for all applications from that server 208.

In one embodiment, when the UE 202 sends a wake-me-up request to the network 206, if the UE 202 is configured with CATS, and an application used is in a CATS black list (i.e., not allowed when CATS is configured and active), then the network 206 will automatically activate CATS for that application in all other applicable UEs. In one embodiment, the network 206 uses UE specific information as well as its CATS information to allow or reject the start of a process to connect with a third party server 208. In one embodiment, when CATS is activated in one UE 202, the UE 202 can notify nearby UEs (e.g., via D2D communication) that the server 208 is overloaded. Such nearby UEs can then activate CATS and not access the server 208 until they are notified that the server 208 is restored. In one embodiment, one UE 202 can be configured as the center UE. When CATS is activated in the center UE, the center UE can notify nearby UEs via D2D communication that they should first inquire with the center UE if the server 208 is restored. The other UEs will then only try to access the server 208 if the center UE informs them that the server 208 is restored. In one embodiment, one UE 202 can be configured as the center UE. Whenever nearby UEs want to access a server 208 for which the application is on the CATS black list, the nearby UEs should first inquire with the center UE whether the server 208 is OK. In one embodiment, nearby UEs only try to access the server 208 if the center UE informs them that the server 208 is OK. When CATS is activated or a third party server 208 is down, the network 206 need only inform the center UE.

Figure 8:
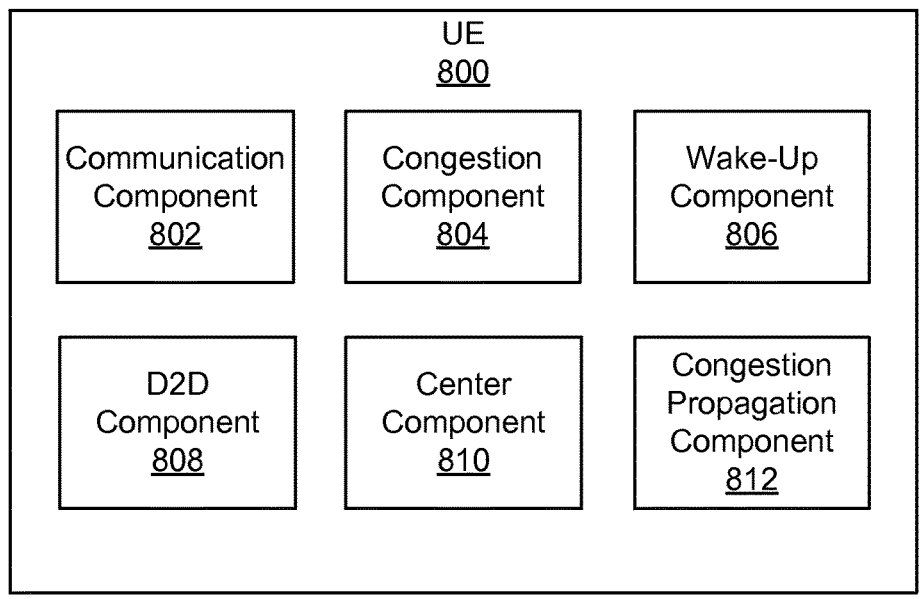
FIG. 8 is a schematic block diagram illustrating components of a user equipment (UE) consistent with embodiments disclosed herein.

FIG. 8 is a schematic block diagram illustrating one embodiment of a UE 800. The UE 800 includes a communication component 802, a congestion component 804, a wake-up component 806, a D2D component 808, a center component 810, and a congestion propagation component 812. In one embodiment, the UE 800 and the components 802-812 are configured to perform any of the functions of a UE or wireless communication device discussed herein.

The communication component 802 is configured to send and receive messages for the UE 800. For example, the communication component 802 may include one or more radios, antennas, or the like to provide wired or wireless communications with a base station, peer UE, or the like. In one embodiment, the communication component 802 is configured to send one or more service requests to a third party server via a mobile communications network. For example, the mobile communications network may include an EPC 160. In one embodiment, the communication component 802 is configured to receive a service response from a third party server or other device. The communication component 802 may send and receive messages or signals on behalf of the UE 800 and/or the other components 804-812.

The congestion component 804 is configured to determine when there is congestion, failure, or another error with a third party server. In one embodiment, the congestion component 804 determines that there is an error or delay in receiving a response to one or more service requests from the third party server. The congestion component 804 may determine that there is an error or delay when the number of service requests sent without a service response exceeds a threshold. The congestion component 804 may determine that there is an error or delay when a delay in receiving a response to a service request exceeds a threshold. The congestion component 804 may determine that there is an error or delay when a response received from the server indicates a failure in responding to the one or more service requests. The congestion component 804 may determine that there is an error or delay when the UE 800 receives an indication from a mobile communications network that requests to a specific third party server are forbidden.

In one embodiment, the wake-up component 806 is configured to send a wake-up request to a network element in the mobile communications network requesting notification when the third party server is available. For example, the wake-up component 806 may request a wake-up notification in response to the congestion component determining there is congestion, failure, or another error with a third party server. In one embodiment, the wake-up component 806 is configured to receive a wake-up notification from an element of the mobile communications network when the third party server is available. In one embodiment, in response to receiving the wake-up message, the UE 800 is configured to send one or more additional service requests to the third party server. In one embodiment, the wake-up message from the network element may indicate an alternate third party server, and the UE 800 may send one or more alternate service requests to the alternate third party server. For example, the alternate third party server may be able to provide the service requested by the UE 800. In one embodiment, in response to receiving a wake-up message, the UE 800 may send one or more additional service requests to the third party server. In one embodiment, in response to sending the one or more additional service requests, the UE 800 may then receive a service response from the third party server.

In one embodiment, the D2D component 808 is configured to discover and/or communicate with one or more proximal wireless communication devices (e.g., UEs) in range for direct communication. For example, the D2D component 808 may discover and establish a direct communication session with the proximal UEs to allow D2D communication.

In one embodiment, the center component 810 allows the UE 800 to be configured as a center UE for propagating congestion or failure information for one or more third party servers. In one embodiment, the center component 810 is configured to receive a message configuring the wireless communication device as a center wireless communication device or center UE. In one embodiment, the UE 800 receives an indication of congestion or failure from a mobile communications network and sends the message over a D2D communication resource in response to configuring the UE 800 as a center UE. In one embodiment, the center component 810 is configured to indicate to one or more proximal wireless communication devices or UEs that the UE 800 is configured as the center UE. This will allow the proximal devices to know that the UE 800 may relay congestion or failure information to the proximal UEs. In one embodiment, the center component 810 is configured to receive a query from a proximal UE regarding the status of a third party server. For example, the proximal devices may contact the UE 800 in order to determine whether a third party server is available for responding to service requests.

The congestion propagation component 812 is configured to propagate information about congested or down third party servers to nearby peer devices. For example, the congestion propagation component 812 may propagate congestion information in response to UE 800 being configured as a center UE. In one embodiment, the congestion propagation component 812 is configured to send a message over a direct communication resource to one or more proximal UEs indicating that requests to a specific third party server are forbidden by a mobile communications network. In one embodiment, sending the message over a D2D communication resource includes sending in response to receiving a query regarding a status of a third party server. In one embodiment, a message indicating that requests to a specific third party server are forbidden may indicate a time period during which requests to the specific third party server are forbidden. In one embodiment, a message indicating that requests to a specific third party server are forbidden may indicate that the third party server is not accessible until further notice. In one embodiment, the UE 800, when configured as a center UE, may indicate that the UE 800 should be queried attempts are made to access a third party server. In one embodiment, the UE 800 may receive a notice of congestion from a peer UE that has been configured as a center UE.

Figure 9:
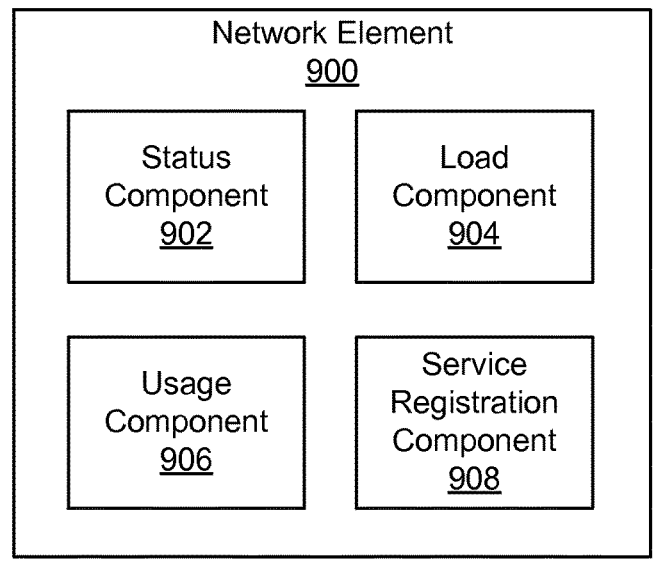
FIG. 9 is a schematic block diagram illustrating components of a network element consistent with embodiments disclosed herein.

FIG. 9 is a schematic block diagram illustrating one embodiment of a network element 900. The network element 900 includes a status component 902, a load component 904, a usage component 906, and a service registration component 908. The network element 900 may include one or more servers, functions, or the like to implement any of the functionalities of the network discussed herein. In one embodiment, the network element 900 may include an MME 130, an S-GW 120, and/or a P-GW 142. In one embodiment, the network element 900 may include functionality implemented on any one or more elements or entities of the EPC 160.

The status component 902 is configured to determine a status of one or more third party servers. In one embodiment, the status component 902 is configured to determine that the specific third party server is experiencing congestion or failure. In one embodiment, the status component 902 determines a status of each of one or more third party servers and stores an indication of the status. In one embodiment, determining that the specific third party server is experiencing congestion or failure includes referencing an indication of the status of the specific third party server. In one embodiment, determining a status of each of the one or more third party servers includes periodically requesting the status of each of the servers from the servers. In one embodiment, determining that a specific third party server is experiencing congestion or failure includes one or more of: sending a request to the specific third party server to determine a congestion/failure status; receiving a message directly from the third party server indicating the congestion/failure status; inspecting a packet to determine how many requests have been sent to the server and/or whether the service requests have been fulfilled and/or if an error message has been received; and receiving a notification from one or more of the mobile communication devices indicating that the server is not responsive.

The load component 904 is configured to reduce service requests to an unavailable server. In one embodiment, the load component 904 sends a message preventing mobile communication devices from sending requests to a specific third party server. For example, the load component 904 may send the message preventing service requests in response to determining that the specific third party server is congested. In one embodiment, the message preventing UEs connected to the specific third party server from sending additional requests to the specific third party server indicates a time period during which requests to the specific third party server are forbidden. In one embodiment, a message preventing mobile communication devices connected to the specific third party server from sending additional requests to the specific third party server indicates an alternative third party server for fulfilling a service request.

The usage component 906 determines how much a specific third party server may be used by attached UEs. For example, the usage component 906 may determine that the number of UEs that are, or will be, requesting service from a specific third party server exceeds a threshold. In one embodiment, the load component 904 may only inhibit further messages when the threshold is reached or succeeded. In one embodiment, the status component 902 may only determine or store a status of a third party server if the usage component 906 determines that a threshold is met for that specific third party server.

The service registration component 908 may allow UEs to register a specific third party server that the UE will be accessing or requesting services from. In one embodiment, the service registration component 908 receives one or more service registration requests for one or more third party servers. The one or more service registration requests indicate the one or more third party servers from which service will be requested. The service registration component 908 may store a list of the registered servers and/or their status. The status component 902, or other components, may access the list of registered servers to determine whether to retrieve status information, block access, or the like.

Figure 10:
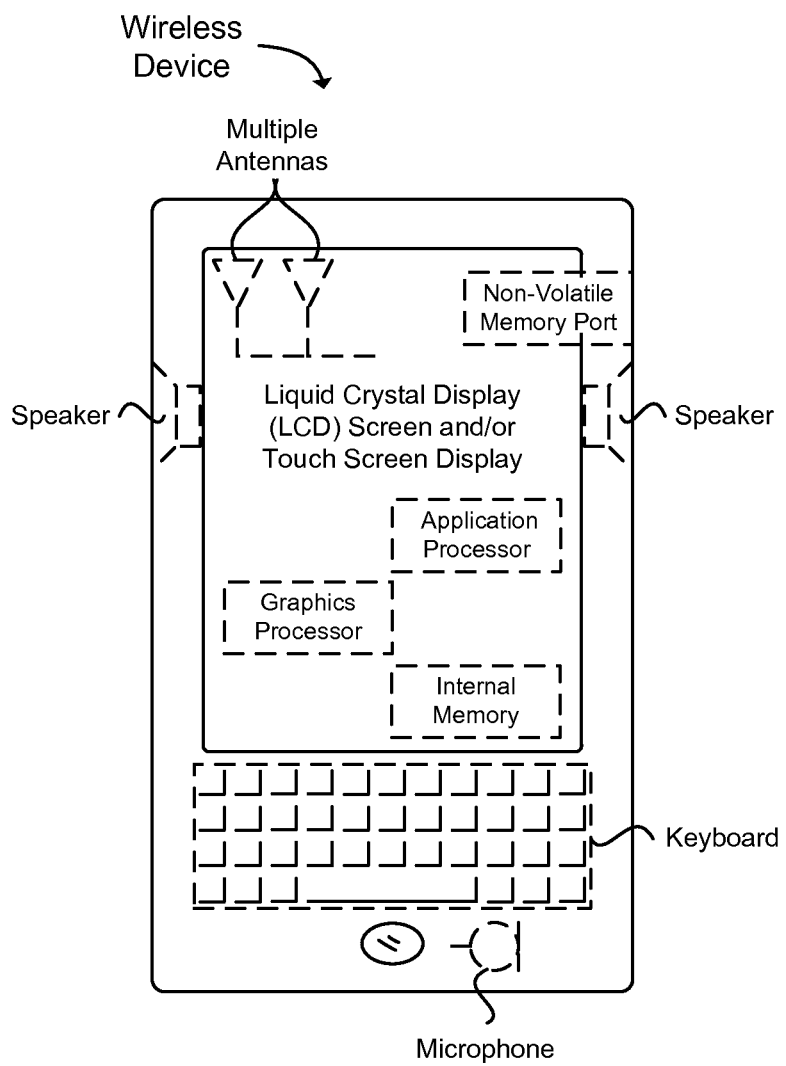
FIG. 10 is a schematic diagram of a mobile device consistent with embodiments disclosed herein.

FIG. 10 is an example illustration of a mobile device, such as a user equipment (UE), a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 10 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Examples

The following examples pertain to further embodiments.

Example 1 is a UE that includes a transceiver configured to transmit and receive signals and a processing unit. The processing unit is configured to cause the UE to send, using the transceiver, one or more service requests to a third party server via a mobile communications network, wherein the mobile communications network comprises an EPC. The processing unit is configured to cause the UE to determine that there is an error or delay in receiving a response to the one or more service requests from the third party server. The processing unit is configured to cause the UE to send a wake-up request to a network element in the mobile communications network requesting notification when the third party server is available.

In Example 2, determining that there is an error or delay in Example 1 includes determining that one or more of: a number of sent service requests without a service response exceeds a threshold; a delay in receiving a response to a service request exceeds a threshold; and a response received from the server indicates failure in responding to the one or more service requests.

In Example 3, the processing unit in any of Examples 1-2 is further configured to cause the UE to receive a wake-up notification from the network element indicating that the third party server is available.

In Example 4, the processing unit in any of Examples 1-3 is further configured to cause the UE to, in response to receiving the wake-up notification, send one or more additional service requests to the third party server.

In Example 5, the processing unit in any of Examples 1-4 is further configured to cause the UE to, in response to sending the one or more additional service requests, receive a service response from the third party server.

In Example 6, wherein the processing unit in any of Examples 1-5 is further configured to cause the UE to receive a wake-up message indicating an alternate third party server and send one or more alternate service requests to the alternate third party server.

Example 7 is a network element that includes one or more processing units and memory coupled with the one or more processing units, the memory storing instructions which when executed by the one or more processing units, cause the network element to perform operations. The instructions cause the network element to determine that a number of mobile communication devices that are requesting service from a specific server exceeds a threshold. The instructions cause the network element to determine that the specific server is experiencing one or more of congestion and failure. The instructions cause the network element to send a message preventing the mobile communication devices from sending additional requests to the specific server.

In Example 8, the instructions in Example 7 further cause the network element to receive one or more service registration requests for one or more servers, wherein the one or more servers comprise the specific server, and wherein the one or more service registration requests indicate the one or more servers from which service will be requested.

In Example 9, the instructions in any of Examples 7-8 further cause the network element to determine a status of each of the one or more servers and store an indication of the status, wherein determining that the specific server is experiencing one or more of congestion and failure comprises referencing an indication of the status of the specific server.

In Example 10, determining a status of each of the one or more servers in any of Examples 7-9 includes periodically requesting a status of each of the one or more servers from the one or more servers.

In Example 11, determining that the specific server is experiencing one or more of congestion and failure in any of Examples 7-10 includes one or more of: sending a request to the specific server to determine a congestion/failure status; receiving a message directly from the server indicating the congestion/failure status; inspecting a packet to determine how many requests have been sent to the server; and receiving a notification from one or more of the mobile communication devices indicating that the server is not responsive.

In Example 12, the message preventing mobile communication devices trying to connect to the specific server from sending additional requests to the specific server in any of Examples 7-12 indicates a time period during which requests to the specific server are forbidden.

In Example 13, the message in Example 12 is a dedicated signaling message to a mobile communication device that sent an initial request.

In Example 14, the message in Example 12 is a broadcast message in a selected set of cells.

In Example 15, the message preventing mobile communication devices trying to connect to the specific server from sending additional requests to the specific server in any of Examples 6-14 indicates an alternative server for fulfilling a service request.

Example 16 is a wireless communication device comprising circuitry. The circuitry is configured to discover one or more proximal wireless communication devices in range for direct communication. The circuitry is configured to receive an indication from a mobile communications network that requests to a specific server are forbidden, wherein the specific server is located outside a core network of the mobile communications network. The circuitry is configured to send a message over a direct communication resource to the one or more proximal wireless communication devices indicating that requests to the specific server are forbidden by the mobile communications network.

In Example 17, the circuitry of Example 16 is further configured to receive a message configuring the wireless communication device as a center wireless communication device.

In Example 18, receiving the indication from the mobile communications network and sending the message over the direct communication resource in any of Examples 16-18 includes receiving and sending in response to configuring the wireless communication device as a center wireless communication device.

In Example 19, the circuitry in any of Examples 16-18 is further configured to indicate to the one or more proximal wireless communication devices that the wireless communication device is configured as a center wireless communication device.

In Example 20, the circuitry in any of Examples 16-19 is further configured to receive a query from a proximal wireless communication device of the one or more proximal wireless communication devices regarding the status of the specific server.

In Example 21, sending the message over a direct communication resource in Example 20 includes sending in response to receiving the query.

In Example 22, the message indicating that requests to the specific server are forbidden in any of Examples 16-21 further indicates a time period during which requests to the specific server are forbidden.

Example 23 is a method that includes sending one or more service requests to a server via a mobile communications network, wherein the mobile communications network comprises an EPC. The method includes determining that there is an error or delay in receiving a response to the one or more service requests from the server. The method includes sending a wake-up request to a network element in the mobile communications network requesting notification when the server is available.

In Example 24, determining that there is an error or delay in Example 23 includes determining that one or more of: a number of sent service requests without a service response exceeds a threshold; a delay in receiving a response to a service request exceeds a threshold; and a response received from the server indicates failure in responding to the one or more service requests.

In Example 25, the method of any of Examples 23-24 includes one or more of receiving a wake-up notification from the network element indicating that the server is available and, in response to receiving the wake-up notification, sending one or more additional service requests to the server.

In Example 26, the method of any of Examples 23-25 further includes, in response to sending the one or more additional service requests, receiving a service response from the server.

In Example 27, the method of any of Examples 23-26 includes receiving a wake-up message indicating an alternate server and sending one or more alternate service requests to the alternate server.

Example 28 is a method that includes determining that a number of mobile communication devices that are requesting service from a specific server exceeds a threshold. The method includes determining that the specific server is experiencing one or more of congestion and failure. The method includes sending a message preventing the mobile communication devices from sending additional requests to the specific server.

In Example 29, the method of Example 28 further includes receiving one or more service registration requests for one or more servers, wherein the one or more servers comprise the specific server, and wherein the one or more service registration requests indicate the one or more servers from which service will be requested.

In Example 30, the method of any of Examples 28-29 further includes determining a status of each of the one or more servers and storing an indication of the status, wherein determining that the specific server is experiencing one or more of congestion and failure comprises referencing an indication of the status of the specific server.

In Example 31, determining a status of each of the one or more servers in any of Examples 28-30 includes periodically requesting a status of each of the one or more servers from the one or more servers.

In Example 32, determining that the specific server is experiencing one or more of congestion and failure in any of Examples 28-31 includes one or more of: sending a request to the specific server to determine a congestion/failure status; receiving a message directly from the server indicating the congestion/failure status; inspecting a packet to determine how many requests have been sent to the server; and receiving a notification from one or more of the mobile communication devices indicating that the server is not responsive.

In Example 33, the message preventing mobile communication devices trying to connect to the specific server from sending additional requests to the specific server in any of Examples 28-32 indicates a time period during which requests to the specific server are forbidden.

In Example 34, the message of Example 33 includes a dedicated signaling message to a mobile communication device that sent an initial request and a broadcast message in a selected set of cells.

In Example 35, the message preventing mobile communication devices trying to connect to the specific server from sending additional requests to the specific server in any of Examples 28-24 indicates an alternative server for fulfilling a service request.

Example 36 is an apparatus that includes means to perform a method as in any of Examples 28-35.

Example 37 is a machine readable storage including machine-readable instructions, when executed, to implement a method or realize an apparatus as in any of Examples 28-36.

Example 38 is a method that includes discovering one or more proximal wireless communication devices in range for direct communication with a wireless communication device. The method includes receiving an indication from a mobile communications network that requests to a specific server are forbidden. The method includes sending a message over a direct communication resource to the one or more proximal wireless communication devices indicating that requests to the specific server are forbidden by the mobile communications network.

In Example 39, the method of Example 38 further includes receiving a message configuring the wireless communication device as a center wireless communication device.

In Example 40, receiving the indication from the mobile communications network and sending the message over the direct communication resource in any of Examples 38-39 includes receiving and sending in response to configuring the wireless communication device as a center wireless communication device.

In Example 41, the method of any of Examples 38-40 further include indicating to the one or more proximal wireless communication devices that the wireless communication device is configured as a center wireless communication device.

In Example 42, the method of any of Examples 38-14 further include receiving a query from a proximal wireless communication device of the one or more proximal wireless communication devices regarding the status of the specific server.

In Example 43, sending the message over a direct communication resource in Example 42 includes sending in response to receiving the query.

In Example 44, the message indicating that requests to the specific server are forbidden in any of Examples 38-43 further indicates a time period during which requests to the specific server are forbidden.

Example 45 is an apparatus including means to perform a method as in any of Examples 38-44.

Example 46 is a machine readable storage including machine-readable instructions, when executed, to implement a method or realize an apparatus as in any of Examples 38-45.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A wireless communication device comprising circuitry configured to:
    discover one or more proximal wireless communication devices in range for direct communication;
    receive an indication from a mobile communications network that requests to a specific server are forbidden, wherein the specific server is located outside a core network of the mobile communications network;
    send a message over a direct communication resource to the one or more proximal wireless communication devices indicating that requests to the specific server are forbidden by the mobile communications network; and
    receive a query from a proximal wireless communication device of the one or more proximal wireless communication devices regarding the status of the specific server.

2. The wireless communication device of claim 1, wherein the wireless communication device is further configured to receive a message configuring the wireless communication device as a center wireless communication device.

3. The wireless communication device of claim 2, wherein receiving the indication from the mobile communications network and sending the message over the direct communication resource comprises receiving and sending in response to configuring the wireless communication device as a center wireless communication device.

4. The wireless communication device of claim 2, wherein the wireless communication device is further configured to indicate to the one or more proximal wireless communication devices that the wireless communication device is configured as a center wireless communication device.

5. The wireless communication device of claim 2, wherein the message indicating that requests to the specific server are forbidden further indicates a time period during which requests to the specific server are forbidden.

6. The wireless communication device of claim 1, wherein sending the message over a direct communication resource comprises sending in response to receiving the query.

7. A wireless communication device comprising: one or more processing units; and
    memory coupled with the one or more processing units, the memory storing instructions which when executed by the one or more processing units, cause the wireless communication device to:
        discover one or more proximal wireless communication devices in range for direct communication;
        receive an indication from a mobile communications network that requests to a specific server are forbidden, wherein the specific server is located outside a core network of the mobile communications network; and
        send a message over a direct communication resource to the one or more proximal wireless communication devices indicating that requests to the specific server are forbidden by the mobile communications network, wherein the wireless communication device is further configured to receive a message configuring the wireless communication device as a center wireless communication device.

8. The wireless communication device of claim 7, wherein receiving the indication from the mobile communications network and sending the message over the direct communication resource comprises receiving and sending in response to configuring the wireless communication device as a center wireless communication device.

9. The wireless communication device of claim 7, wherein the wireless communication device is further configured to indicate to the one or more proximal wireless communication devices that the wireless communication device is configured as a center wireless communication device.

10. The wireless communication device of claim 7, wherein the wireless communication device is further configured to receive a query from a proximal wireless communication device of the one or more proximal wireless communication devices regarding the status of the specific server.

11. The wireless communication device of claim 10, wherein sending the message over a direct communication resource comprises sending in response to receiving the query.

12. The wireless communication device of claim 7, wherein the message indicating that requests to the specific server are forbidden further indicates a time period during which requests to the specific server are forbidden.

* * * * *